(12) United States Patent
Ochiai et al.

(10) Patent No.: US 8,550,494 B2
(45) Date of Patent: Oct. 8, 2013

(54) SIDE CURTAIN AIRBAG

(75) Inventors: Fumiharu Ochiai, Wako (JP); Koji Ikeda, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/477,339

(22) Filed: May 22, 2012

(65) Prior Publication Data

US 2012/0313354 A1 Dec. 13, 2012

(30) Foreign Application Priority Data

Jun. 9, 2011 (JP) ................................. 2011-129275

(51) Int. Cl.
*B60R 21/213* (2011.01)
*B60R 21/232* (2011.01)

(52) U.S. Cl.
USPC ..................................... 280/730.2; 280/728.2

(58) Field of Classification Search
USPC ........................................... 280/730.2, 728.2
See application file for complete search history.

(56) References Cited

U.S. PATENT DOCUMENTS

| | | | |
|---|---|---|---|
| 6,371,512 B1 * | 4/2002 | Asano et al. ................ | 280/730.2 |
| 7,121,579 B2 * | 10/2006 | Ochiai et al. ............... | 280/730.2 |
| 7,213,836 B2 * | 5/2007 | Coon et al. ................. | 280/730.2 |
| 7,401,805 B2 * | 7/2008 | Coon et al. ................. | 280/730.2 |
| 7,407,182 B2 * | 8/2008 | Aoki et al. ................. | 280/730.2 |
| 7,434,831 B2 * | 10/2008 | Noguchi et al. ........... | 280/730.2 |
| 8,091,918 B2 * | 1/2012 | Mitchell et al. ............ | 280/728.2 |
| 2006/0061075 A1 * | 3/2006 | Aoki et al. ................. | 280/730.2 |
| 2006/0119084 A1 * | 6/2006 | Coon et al. ................. | 280/730.2 |
| 2011/0127755 A1 * | 6/2011 | Beppu et al. .............. | 280/730.2 |
| 2011/0187086 A1 * | 8/2011 | Fulmer et al. ............. | 280/730.2 |
| 2012/0126517 A1 * | 5/2012 | Kato et al. ................. | 280/730.2 |

FOREIGN PATENT DOCUMENTS

JP 2007-283825 A 11/2007

* cited by examiner

*Primary Examiner* — Drew Brown
(74) *Attorney, Agent, or Firm* — Westerman, Hattori, Daniels & Adrian, LLP

(57) ABSTRACT

A side curtain airbag includes an airbag body and a plurality of airbag fixation portions. The airbag body is divided into a plurality of cells that are inflated by gas flowing into them. The plurality of airbag fixation portions are provided along the upper periphery of the airbag body and attached to a plurality of vehicle body side fixation portions. In a state before attachment, of the plurality of airbag fixation portions, an upper front airbag fixation portion is located above the vehicle body side fixation portion corresponding to the airbag fixation portion, and at substantially the same level as the other airbag fixation portions. Of the plurality of cells, an upper front cell is formed so as to bulge close to the upper front airbag fixation portion.

16 Claims, 16 Drawing Sheets

SIDE CURTAIN AIRBAG

CROSS REFERENCES TO RELATED APPLICATIONS

The present application claims priority under 35 U.S.C. §119 to Japanese Patent Application No. 2011-129275, filed Jun. 9, 2011, entitled "Side Curtain Airbag." The contents of this application are incorporated herein by reference in their entirety.

TECHNICAL FIELD

The present disclosure relates to a side curtain airbag.

BACKGROUND

There has been known a side curtain airbag that deploys an airbag body like a curtain between the side of the vehicle body and occupants and thereby widely protects the occupants when an impact is input at the time of a vehicle side collision, rollover, or the like.

The side curtain airbag is stored between a vehicle body pillar and a garnish (interior decoration member). Specifically, a garnish is attached to a vehicle body pillar so as to cover it, and an airbag body is stored in a folded state between the vehicle body pillar and the garnish. When an impact is input, high-pressure gas is ejected from an inflator, and thereby the airbag body is inflated. By this inflation pressure, the garnish can be moved while being pushed to open toward the interior of the vehicle. Thus, through a gap formed between the vehicle body pillar and the garnish, the airbag body is deployed in the interior of the vehicle, for example, so as to cover the entire surfaces of the side windows, like a curtain.

Examples of this type of side curtain airbag are shown in FIG. 12 and FIG. 13. The side curtain airbag 100 shown in FIG. 12 has an airbag body 110 that extends in the front-rear direction of a vehicle and covers front and rear side windows, and a plurality of fixation tabs 120 for attaching the airbag body 110 to the vehicle body.

The airbag body 110 is divided into a plurality of cells (air chambers) 101 that are inflated by high-pressure gas accumulated therein. The plurality of cells 101 are disposed substantially throughout the airbag body 110 in order to stably obtain the occupant protection performance. The upper periphery of the airbag body 110 has a shape corresponding to the shape of a vehicle opening 150 formed by the vehicle body pillars and the roof side rail. On the upper periphery of the airbag body 110 that follows the shape of the vehicle opening 150, the plurality of fixation tabs 120 are provided. The plurality of fixation tabs 120 are provided at positions corresponding to airbag fixation portions 151 disposed along the vehicle opening 150. For this reason, the frontmost fixation tab 120 (120A) is located below the other fixation tabs 120.

The side curtain airbag 200 shown in FIG. 13 is formed such that an airbag body 210 having a plurality of cells 201 extends linearly in the front-rear direction of the vehicle regardless of the shape of the vehicle opening 150. Thus, the frontmost fixation tab 220 (220A) is located at substantially the same level as the other fixation tabs 220.

The side curtain airbags 100 and 200 are both set by appropriately folding the airbag bodies 110 and 210 and then attaching the plurality of fixation tabs 120 and 220 to the airbag fixation portions 151.

In general, in the case where the airbag body deploys when an impact is input, the airbag body deploys while pushing the garnish to open toward the interior of the vehicle, through a gap formed between the vehicle body pillar and the garnish. Thus, after the deployment of the airbag body, the garnish is away from the vehicle body pillar, and there is a possibility that the impact absorbing performance of the garnish itself obtained by being close to the vehicle body pillar is not sufficiently obtained.

It is known to provide an urging device, such as a coil spring, that urges the garnish toward the vehicle body pillar to obtain the impact absorbing performance of the garnish itself even after the deployment of the airbag body (see Japanese Unexamined Patent Application Publication No. 2007-283825).

In the conventional side curtain airbag shown in FIG. 12, the outline of the airbag body 110 follows the shape of the vehicle opening 150, and the frontmost fixation tab 120 (120A) is located below the other fixation tabs 120. Thus, when folding the airbag body 110, the airbag body 110 needs to be folded carefully such that the frontmost fixation tab 120 (120A) is not in a roll. For example, it is necessary to fold the airbag body 110 from its lower end into concertinas, or to roll the airbag body 110 to the position of the frontmost fixation tab 120 (120A) and to then fold the rest into concertinas as shown in FIG. 14. Folding the airbag body 110 in such complex manners takes time.

In contrast, in the case of the side curtain airbag 200 shown in FIG. 13, the frontmost fixation tab 220 (220A) is located at the same level as the other fixation tabs 220, and thus the airbag body 210 can be rolled from its lower end as shown in FIG. 15. In this regard, this side curtain airbag 200 is favorable. However, since the frontmost fixation tab 220 (220A) is located at the same level as the other fixation tabs 220, a space H is prone to be left between the frontmost fixation tab 220 (220A) and the frontmost cell 201 (201A) as shown in FIG. 13. For this reason, when the airbag body 210 is deployed, the frontmost cell 201 (201A) is away from the airbag fixation portion 151 of the vehicle opening 150, and the frontmost cell 201 (201A) is unstable and prone to move.

When an impact is input, the occupant protection performance is obtained also by the impact absorption by the garnish in cooperation with the deployment of the airbag body. In the above-described conventional side curtain airbag described in Japanese Unexamined Patent Application Publication No. 2007-283825, the impact absorbing performance of the garnish itself is improved by providing an urging device such as a coil spring. However, in this case, while the vehicle is moving, the urging device vibrates owing to various causes (for example, attachment error or play), and there is a possibility that an abnormal noise may be generated by it. In addition, this is likely to increase the cost and weight.

SUMMARY

Accordingly, the present application describes a side curtain airbag that can be easily set while folding the airbag body in a simple manner and in which after the deployment, the airbag body can be stabilized and the occupant protection performance can be improved, and the impact absorbing performance of the interior decoration member itself can be obtained by pressing the interior decoration member against the vehicle body using the airbag body.

In an aspect of the embodiment, a side curtain airbag is fixed to the interior of a vehicle using a plurality of vehicle body side fixation portions provided in a vehicle body frame member along a side opening of a vehicle body, and stored between the vehicle body frame member and an interior decoration member. The side curtain airbag includes an airbag body and a plurality of airbag fixation portions. The airbag body is divided into a plurality of cells that are inflated by gas flowing into them, and deploys toward the interior of the vehicle while pushing the interior decoration member to open. The plurality of airbag fixation portions are provided along the upper periphery of the airbag body and attached to the plurality of vehicle body side fixation portions. In a state before attachment, of the plurality of airbag fixation portions, an upper front airbag fixation portion is located above an upper front vehicle body side fixation portion of the plurality of vehicle body side fixation potions. The upper front vehicle body side fixation portion corresponds to the upper front airbag fixation portion, and the upper front airbag fixation portion is located at substantially the same level as the other airbag fixation portions. Of the plurality of cells, an upper front cell is formed so as to bulge close to the upper front airbag fixation portion. In the present application, the upper front cell may be, but not limited to, the frontmost cell; the upper front airbag fixation portion may be, but not limited to, the frontmost airbag fixation portion; and the upper front vehicle body side fixation portion may be, but not limited to, the frontmost vehicle body side fixation portion. Also, in the present application, the upper rear cell may be, but not limited to, the rearmost cell; the upper rear airbag fixation portion may be, but not limited to, the rearmost airbag fixation portion; and the upper rear vehicle body side fixation portion may be, but not limited to, the rearmost vehicle body side fixation portion.

According to the side curtain airbag of the embodiment, in the state before attachment, a plurality of airbag fixation portions are aligned at substantially the same level. For this reason, the airbag body can be rolled from its lower end in a simple manner, and rolling the airbag body does not take a lot of time. After that, it is only necessary to attach the airbag fixation portions to the vehicle body side fixation portions provided in the vehicle body frame member, and thus the side curtain airbag can be set easily. The upper front airbag fixation portion is attached to the upper front vehicle body side fixation portion by bending the front part of the rolled airbag body downward.

When an impact is input to the vehicle body, gas flows into the airbag body, and the plurality of cells are inflated. Thus, the airbag body can be deployed like a curtain toward the interior of the vehicle while pushing the interior decoration member to open, the side opening of the vehicle body can be covered, and occupants can be protected. In particular, of the cells in the airbag body, the upper front cell has a range of bulging that is set such that the cell bulges close to the upper front airbag fixation portion, and thus the position of the cell after bulging can be easily stabilized. Thus, the ability to protect occupants can be improved.

As described above, when setting the airbag body, the front part thereof is bent downward, and the upper front airbag fixation portion is attached to the vehicle body side fixation portion. Thus, when the airbag body is deployed, the upper front cell is pushed up by the deployment pressure. For this reason, the interior decoration member pushed to open toward the interior of the vehicle by the deployment of the airbag body is pushed by the cell toward the vehicle body frame member and is easily returned to the original state. Thus, the movement of the interior decoration member toward the interior of the vehicle after the deployment of the airbag body can be suppressed. Even after the deployment of the airbag body, the impact absorbing performance of the interior decoration member itself can be obtained.

It is preferable that a fastening member be provided in a part of the front periphery of the airbag body that is located below the plurality of airbag fixation portions in a state before attachment of the airbag body, and when the airbag body is attached, the fastening member be fastened to the vehicle body frame member while pulling up the airbag body.

In this case, the fastening member applies a force that pulls up the airbag body to the airbag body. Thus, after the deployment of the airbag body, the interior decoration member can be pushed toward the vehicle body frame member more effectively. Thus, the movement of the interior decoration member toward the interior of the vehicle after the deployment of the airbag body can be effectively suppressed, and the impact absorbing performance of the interior decoration member itself can be easily obtained.

It is preferable that of the plurality of cells, the upper front cell be deployed at least later than an adjacent cell next to the upper front cell in a rear direction of the vehicle.

In this case, in the early stage of the deployment of the airbag body, the upper front cell is deployed later than the adjacent cell. Thus, the upper front cell less inflated than at the completion of deployment is pulled out toward the interior of the vehicle by the inflation of the adjacent cell. After being pulled out, the upper front cell is inflated and is then completely deployed. Thus, the upper front cell can be pulled out toward the interior of the vehicle when the gap between the interior decoration member and the vehicle body frame member is small, excessive stress can be prevented from acting on the interior decoration member, and the damage of the interior decoration member can be easily prevented. After that, by the complete deployment after being pulled out, the interior decoration member can be pressed against the vehicle body frame member, and the original impact absorbing performance of the interior decoration member itself can be obtained.

It is preferable that the upper front cell is formed such that the internal volume increases as approaching the upper front airbag fixation portion.

In this case, when the airbag body is deployed, the inflated portion of the upper front cell increases as approaching the upper front airbag fixation portion. Thus, the interior decoration member can be pushed toward the vehicle body frame member more effectively, the movement of the interior decoration member toward the interior of the vehicle after the deployment can be effectively suppressed, and the impact absorbing performance of the interior decoration member itself can be easily obtained.

DETAILED DESCRIPTION

An embodiment of the present disclosure will now be described with reference to the drawings. In this embodiment, a five-seat sedan-type vehicle will be described as an example. However, this embodiment is not limited to this type of vehicle. In this embodiment, "front-rear direction," "left-right direction," and "top-bottom direction" will be defined on the basis of the direction of the vehicle shown in FIG. 1.

Configuration of Side Curtain Airbag

Figure 1:
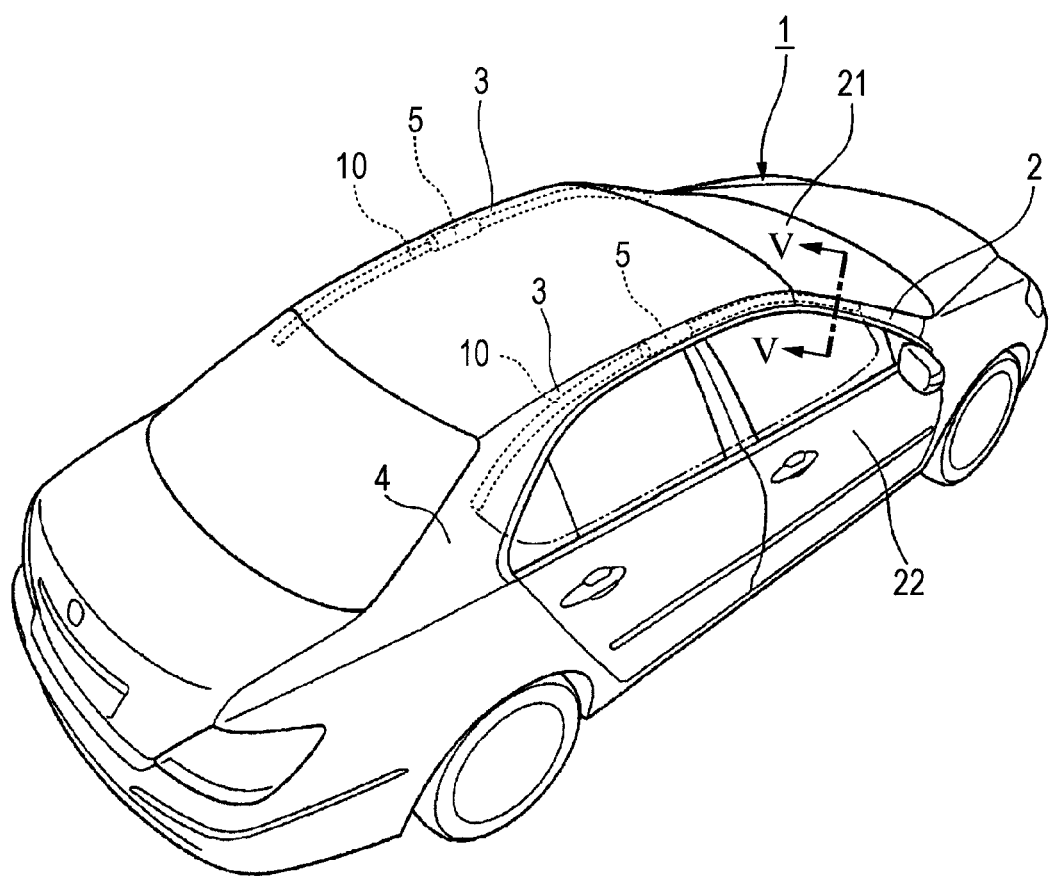
FIG. 1 is a rear perspective view of a vehicle equipped with a side curtain airbag according to an embodiment.

As shown in FIG. 1, a side curtain airbag 10 of this embodiment is fixed to the interior of a vehicle along a side opening of a vehicle body 1 using vehicle body side fixation portions 6 (described later) provided in vehicle body frame members: a front pillar 2, a roof side rail 3, and a rear pillar 4, and is stored between each pillar and a garnish 20 (described below).

Figure 2:
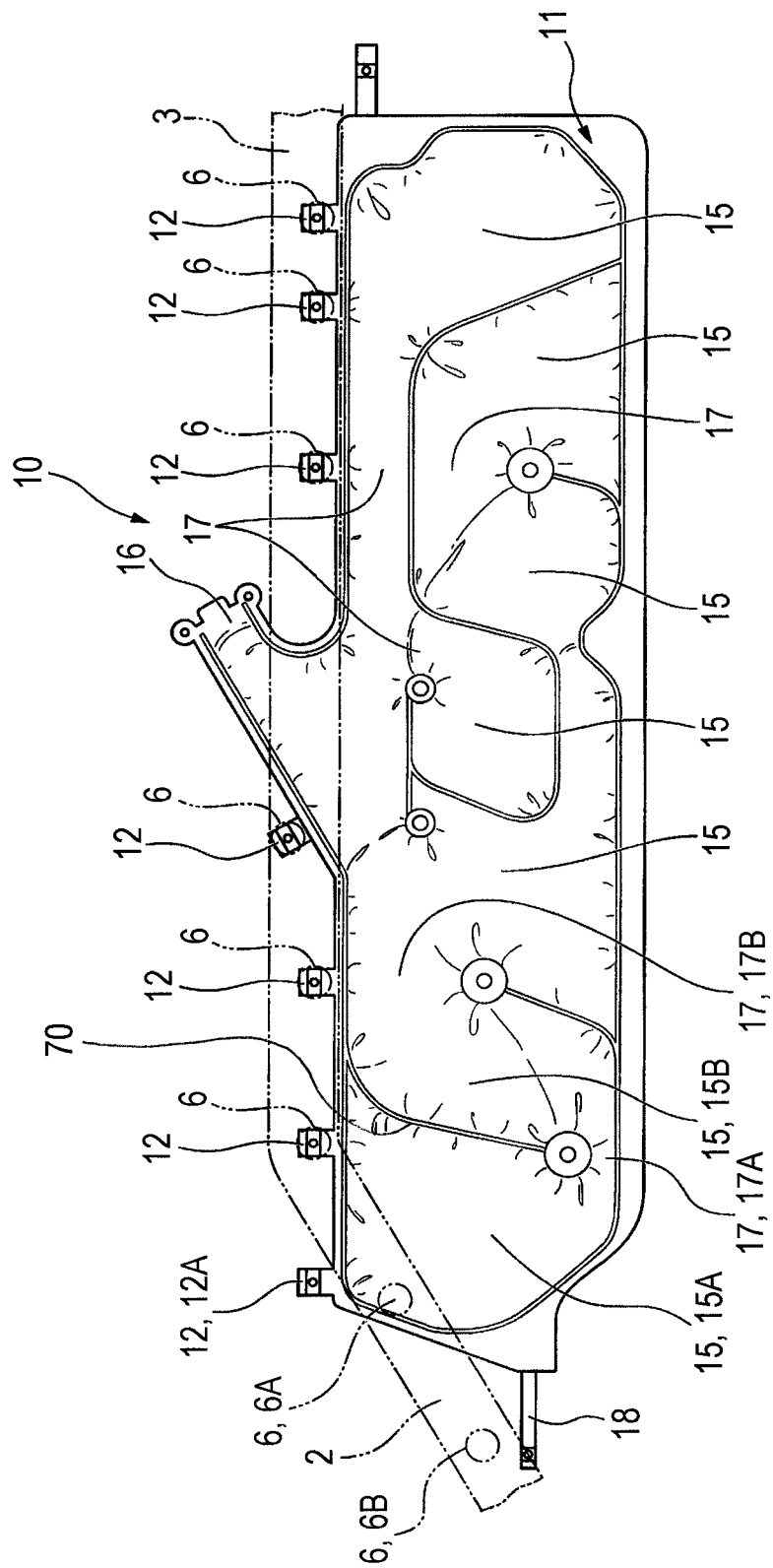
FIG. 2 is a plan view showing the side curtain airbag shown in FIG. 1 after the deployment. However, the side curtain airbag is not attached to the vehicle body.

An inflator 5 provided in the roof side rail 3 supplies gas to an airbag body 11 (see FIG. 2) and thereby deploys the airbag body 11 toward the interior of the vehicle. Thus, the side curtain airbag 10 protects occupants during a vehicle collision or the like. Specifically, as shown in FIG. 2, the side curtain airbag 10 includes an airbag body 11 and a plurality of airbag fixation portions 12. The airbag body 11 is divided into a plurality of cells 15 that are inflated by gas flowing into them, and deploys toward the interior of the vehicle while pushing the garnish 20 to open. The plurality of airbag fixation portions 12 are provided along the upper periphery of the airbag body 11, and are attached to a plurality of vehicle body side fixation portions 6. FIG. 2 is a plan view of the side curtain airbag 10 after deployment that is not attached to the vehicle body 1.

The cells 15 are inflated by gas flowing into them. Thus, the airbag body 11 deploys downward like a curtain and protects occupants on the side of the interior of the vehicle. The airbag body 11 is formed in a substantially rectangular shape that is short in the top-bottom direction and is long in the front-rear direction in plan view. In substantially the middle of the upper peripheral part of the airbag body 11 in the front-rear direction, an inlet 16 through which gas from the inflator 5 flows in is connected. The outer periphery of the airbag body 11 is sewn throughout the circumference, so that gas flowing into the airbag body 11 is trapped in it.

The inside of the airbag body 11 is divided into a plurality of cells 15 by sewing, and gas flow paths 17 are formed in the airbag body 11. Thus, gas flowing into the airbag body 11 through the inlet 16 flows into the cells 15 through predetermined flow paths 17 and accumulates in the cells 15.

The plurality of airbag fixation portions 12 are tabs protruding upward from the upper peripheral part of the airbag body 11, and are spaced in the front-rear direction so as to correspond to the vehicle body side fixation portions 6. The airbag fixation portions 12 are fixed to the vehicle body side fixation portions 6 with fixing screws (not shown). The vehicle body side fixation portions 6 are, for example, screw attachment portions provided along the front pillar 2, the roof side rail 3, and the rear pillar 4. In particular, the two vehicle body side fixation portions 6 (6A and 6B) provided in the front pillar 2 located in the front of the vehicle are located below the other vehicle body side fixation portions 6.

In the state before the attachment shown in FIG. 2, the frontmost airbag fixation portion 12 (12A) is located above the vehicle body side fixation portion 6 (6A) corresponding to the airbag fixation portion 12 (12A), and is provided at substantially the same level as the other airbag fixation portions 12. A front tether (a fastening member) 18 is provided in a part of the front periphery of the airbag body 11 that is located below the above-described plurality of airbag fixation portions 12 in the state before the attachment. The front tether 18 supplementarily fixes the airbag body 11. The front tether 18 is a string-like or belt-like member protruding forward. The front tether 18 is fastened to the vehicle body side fixation portion 6 (6B) provided in the front pillar 2 while pulling up the airbag body 11. The front tether 18 is also fixed with a fixation screw (not shown).

Of the plurality of cells 15 of the airbag body 11, the frontmost cell 15 (15A) has a range of bulging formed such that the cell 15 (15A) bulges close to the above-described airbag fixation portion 12 (12A), and the cell 15 (15A) is formed in a substantially inverted triangular shape in plan view so that the internal volume increases as it approaches the airbag fixation portion 12 (12A).

Gas flow paths 17 are formed by sewing such that the frontmost cell 15 (15A) is deployed at least later than the cell 15 (15B) second from the front. In the example shown in the figure, a flow path 17 (17A) that allows gas to flow into the frontmost cell 15 (15A) is located in the lower part of the airbag body 11, and a flow path 17 (17B) that allows gas to flow into the cell 15 (15B) second from the front is located in the upper part of the airbag body 11. Thus, it is possible to inflate the cell 15 (15B) with gas and to then inflate the cell 15 (15A) with gas.

The frontmost cell 15A and the adjacent cell 15 B are separated from each other by a partitioner 70. The frontmost cell 15A may include a first inflation gas flow path 17A. The front most cell 15A and the adjacent cell 15B are communicated with each other via the first inflation gas flow path 17A. In one example, the first inflation gas flow path 17A may be provided such that the distance between the first inflation gas flow path 17A and the airbag fixation portion 12A is maximized. For example, the first inflation gas flow path 17A may be provided at the lower end of the partitioner 70. The adjacent cell 15B may include a second inflation gas flow path 17B. By disposing the second inflation gas flow path 17B at the upper portion of the adjacent cell 15B, an inflation gas flow channel may be formed such that the channel starts from the second inflation gas flow path 17B, passes through the adjacent cell 15B, and reaches the first inflation gas flow path 17A. For example, the second inflation gas flow path 17B may be disposed at an upper end of a partitioner which separates the adjacent cell 15B from the rearward next cell. The frontmost cell 15A may be formed such that the internal volume is the smallest at the first inflation gas flow path 17A, increases as approaching the airbag fixation portion 12A, and is the largest at, or in the vicinity of, the airbag fixation portion 12A.

Figure 3:
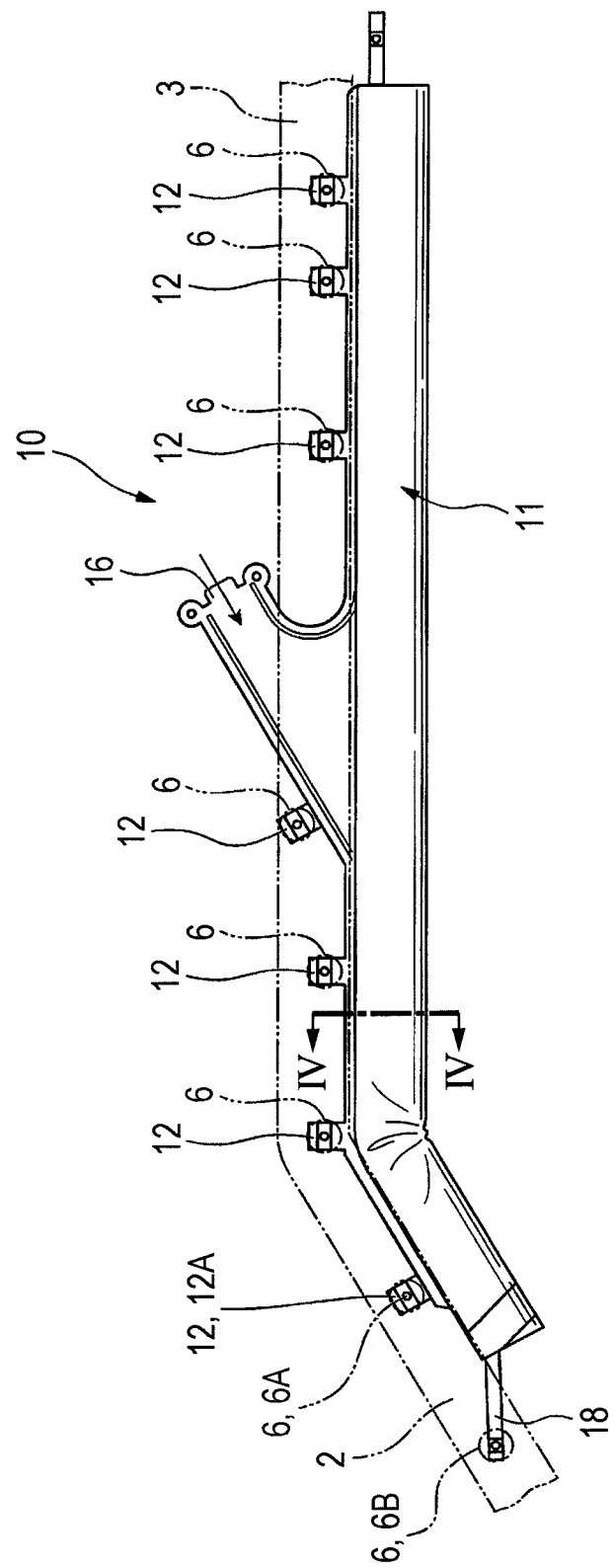
FIG. 3 shows the airbag body shown in FIG. 2 that is folded and attached to the vehicle body.
Figure 4:
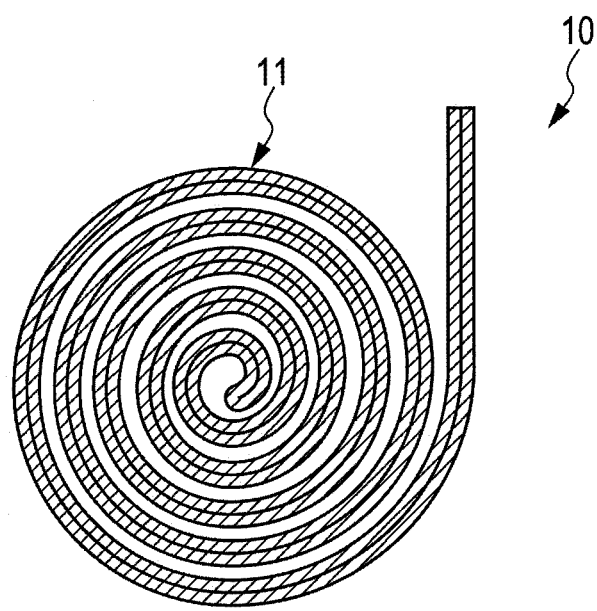
FIG. 4 is a sectional view taken along line IV-IV of FIG. 3.

The airbag body 11 configured as above is rolled from its lower end in a simple manner as shown in FIG. 3 and FIG. 4, and is then set by attaching the airbag fixation portions 12 to the vehicle body side fixation portions 6. By bending the front part of the rolled airbag body 11 downward, the frontmost airbag fixation portion 12 (12A) is attached to the vehicle body side fixation portion 6 (6A). As described above, the front tether 18 is attached to the vehicle body side fixation portion 6 (6B) while pulling up the airbag body 11.

Figure 5:
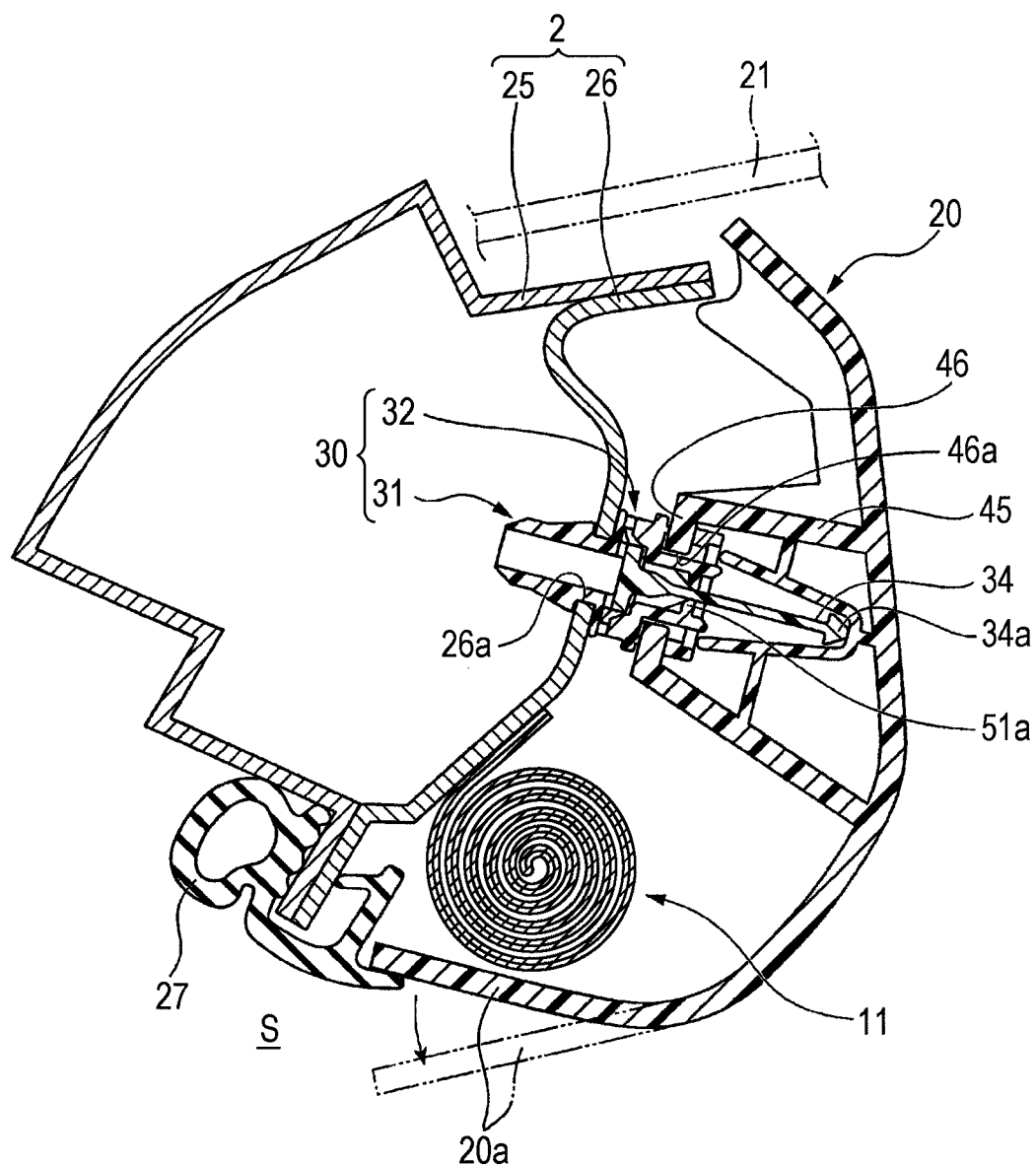
FIG. 5 is a sectional view taken along line V-V of FIG. 1 and showing the side curtain airbag attached to the front pillar.

The side curtain airbag 10 attached as described above is stored between the front pillar 2 and the garnish (interior decoration member) 20 as shown in FIG. 5. Here, how the side curtain airbag 10 is attached to the front pillar 2 will be described as an example. The side curtain airbag 10 is attached to the roof side rail 3 and the rear pillar 4 in the same manner as the side curtain airbag 10 is attached to the front pillar 2.

The front pillar 2 is disposed on the border between the front windshield 21 and the front door 22 (see FIG. 1) and is made of steel sheet. The front pillar 2 is formed by joining a pillar outer panel 25 disposed on the outer side of the vehicle and a pillar inner panel 26 disposed on the inner side of the vehicle, by welding or the like. The pillar outer panel 25 is formed in a substantially U shape in cross-sectional view. The pillar outer panel 25 is joined to the pillar inner panel 26 such that the front pillar 2 has a closed section. The frontmost cell 15A is provided corresponding to the front pillar 2. The frontmost cell 15A is attached to the front pillar 2 by the vehicle body side fixation portion 6A provided in the front pillar 2.

The pillar inner panel 26 is provided with the above-described vehicle body side fixation portions 6. Thus, the airbag body 11 is fixed to the pillar inner panel 26 by the airbag fixation portion 12 and the front tether 18, and is disposed on the lower part of the pillar inner panel 26. In a part of the pillar inner panel 26 located above the airbag body 11, an insertion hole 26 for fixing the garnish 20 is formed. A pin member 31 of a fixation clip 30 (described later) is inserted into the insertion hole 26a and is retained therein.

The garnish 20 is formed of resin in a substantially U shape in cross-sectional view. The garnish 20 extends vertically along the front pillar 2 and is disposed so as to cover the pillar inner panel 26 and the side curtain airbag 10. The garnish 20 is fixed to the pillar inner panel 26 with a fixation clip 30.

The lower end wall 20a of the garnish 20 is formed so as to be bendable toward the interior of the vehicle and is pressed by the inflation pressure of the airbag body 11 during the deployment of the airbag body 11. Thus, the lower end wall 20a of the garnish 20 is moved toward the interior of the vehicle while bending toward the interior of the vehicle, and a gap is formed between the pillar inner panel 26 and the garnish 20. The airbag body 11 deploys through this gap downward, toward the interior of the vehicle.

Reference sign S denotes a front door opening that is opened and closed by the front door 22. A joint of the pillar outer panel 25 and the pillar inner panel 26 faces the front door opening S. A weather strip 27 made of rubber is provided on the joint so as to seal a gap between the front pillar 2 and the front door 22 that is opened and closed.

Figure 6:
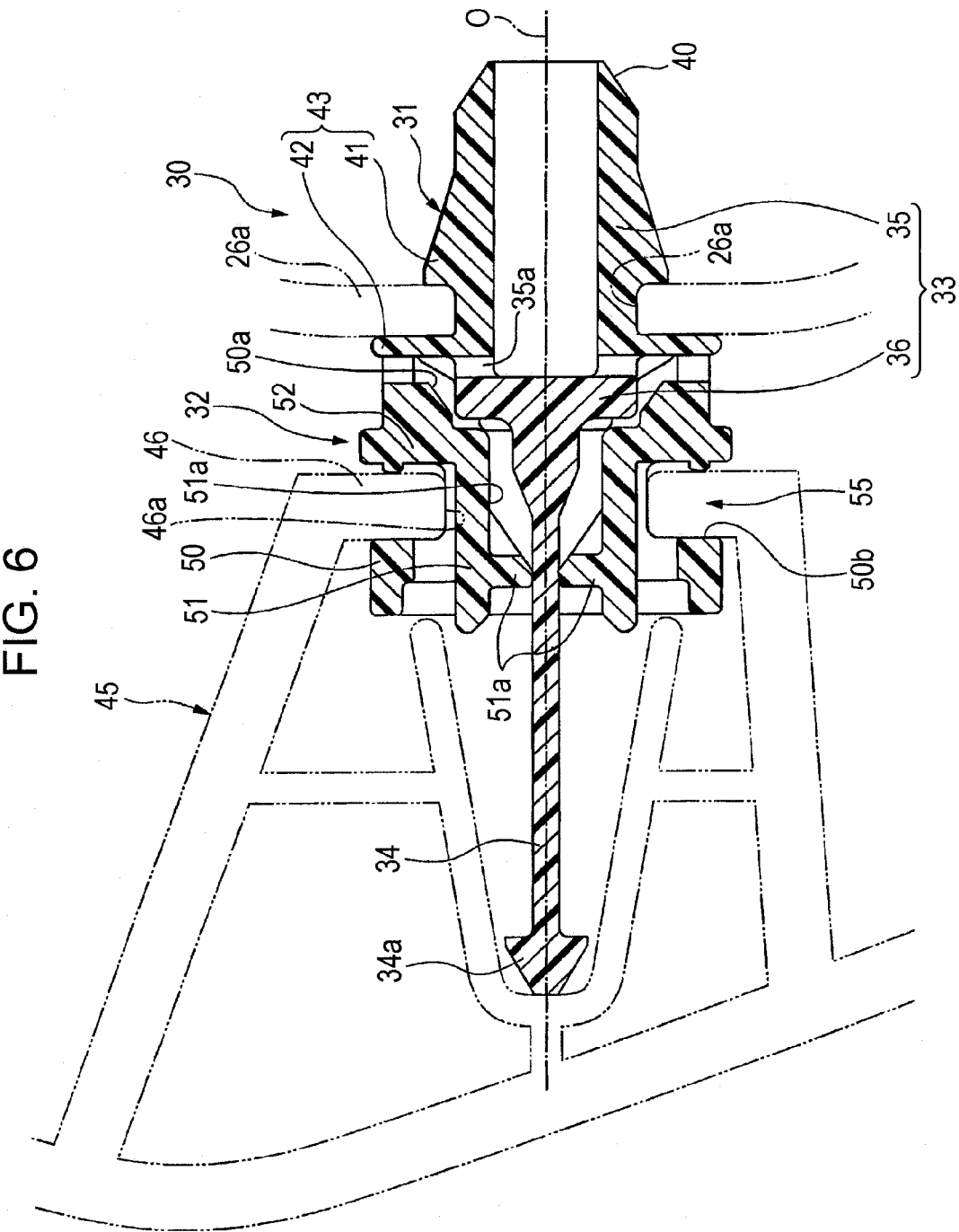
FIG. 6 is an enlarged sectional view of the fixation clip shown in FIG. 5.

The fixation clip 30 is made of resin and consists of two components: a pin member 31 engaged with and fixed to the pillar inner panel 26, and a base member 32 engaged with and fixed to the garnish 20 as shown in FIG. 5 and FIG. 6. The pin member 31 and the base member 32 are disposed coaxially on a common central axis line O.

The pin member 31 has a pin main body 33 and a stroke portion 34 extending from the central part of the proximal end wall portion 36 of the pin main body 33 along the central axis line O. The pin main body 33 has a square tubular circumferential wall portion 35 and a proximal end wall portion 36 that covers an opening at the proximal end of the circumferential wall portion 35. Thus, the pin main body 33 is a hollow member that opens at the distal end thereof. At the distal end of the circumferential wall portion 35, an insertion portion 40 is formed. The insertion portion 40 is inserted into the insertion hole 26a of the pillar inner panel 26. The insertion portion 40 is tapered toward the distal end. Thus, the pin member 31 can be inserted into the insertion hole 26a with slight resistance.

The circumferential wall portion 35 is provided with a first engagement portion 43 consisting of an engagement claw 41 and a flange portion 42. In the circumferential wall portion 35, an opening 35a having a U shape in plan view is formed so as to surround the first engagement portion 43. Thus, the engagement claw 41 can be elastically deformed toward the inside of the pin main body 33. Thus, when the pin member 31 is inserted into the insertion hole 26a, the engagement claw 41 is bent toward the inside of the pin main body 33 and is then restored to its original state by elastic restoring force. Thus, the engagement claw 41 can be engaged with the insertion hole 26a, and the pin member 31 can be firmly fixed to the pillar inner panel 26.

The proximal end wall portion 36 of the pin main body 33 is located in a recess 50a (described later) of the base member 32. On the circumferential wall portion 35 of the pin main body 33, an engagement protrusion (not shown) is provided. This engagement protrusion is engaged with an engagement hole (not shown) formed in the inner wall surface of the recess 50a of the base member 32. This enables the pin member 31 and the base member 32 to be integrally combined by the above engaging force, with the proximal end wall portion 36 of the pin main body 33 located in the recess 50a of the base member 32.

The stroke portion 34 is a flat plate-like member extending in the direction opposite from the insertion portion 40 along the central axis line O. At the end thereof, a stroke restricting portion 34a protruding outward is provided. When the base member 32 moves together with the garnish 20 with the deployment of the airbag body 11, the stroke restricting portion 34a is caught by stroke restricting claws 51a (described later) of the base member 32 and restricts the movement of the base member 32 and the garnish 20. The length of the stroke portion 34 is appropriately set according to the amount of movement of the garnish 20 during the deployment of the airbag body 11.

The base member 32 is attached to a clip attachment portion 45 formed in the garnish 20. The base member 32 is a double tube member including an outer tube portion 50 having a square cross-sectional shape, an inner tube portion 51 disposed inside the outer tube portion 50 and having a square cross-sectional shape, and a flange portion 52 connecting the inner tube portion 51 and the outer tube portion 50.

The inner tube portion 51 is shorter than the outer tube portion 50 in the direction of the central axis line O. The inner tube portion 51 is shifted relative to the outer tube portion 50 to the side of the stroke restricting portion 34a of the pin member 31 and is integral with the outer tube portion 50 with the flange portion 52 therebetween. Inside the base member 32, a through-hole 51a surrounded by the inner tube portion 51 and a recess 50a surrounded by the outer tube portion 50 are stepped and communicated with each other. The base member 32 is combined with the pin member 31 with the recess 50a facing the pin main body 33. As described above, an engagement hole with which the engagement protrusion of the pin main body 33 is engaged is formed in the recess 50a.

In the outer tube portion 50, a second engagement portion 55 is formed that is engaged with and fixed to the garnish 20. The second engagement portion 55 is formed by a groove 50b extending in the circumferential direction about the central axis line O. By inserting the base member 32 into an insertion hole 46a of a pedestal portion 46 formed in the clip attachment portion 45, the pedestal portion 46 is disposed in the groove 50b. Thus, the second engagement portion 55 and the pedestal portion 46 engage with each other, and the base member 32 is engaged with and fixed to the garnish 20.

The inner tube portion 51 is provided with stroke restricting claws 51a protruding inward. The stroke restricting claws 51a are in contact with the stroke portion 34 of the pin member 31 movably relative to it, and engage with the stroke restricting portion 34a of the stroke portion 34 when the base member 32 moves together with the garnish 20.

Operation of Side Curtain Airbag

Figure 7:
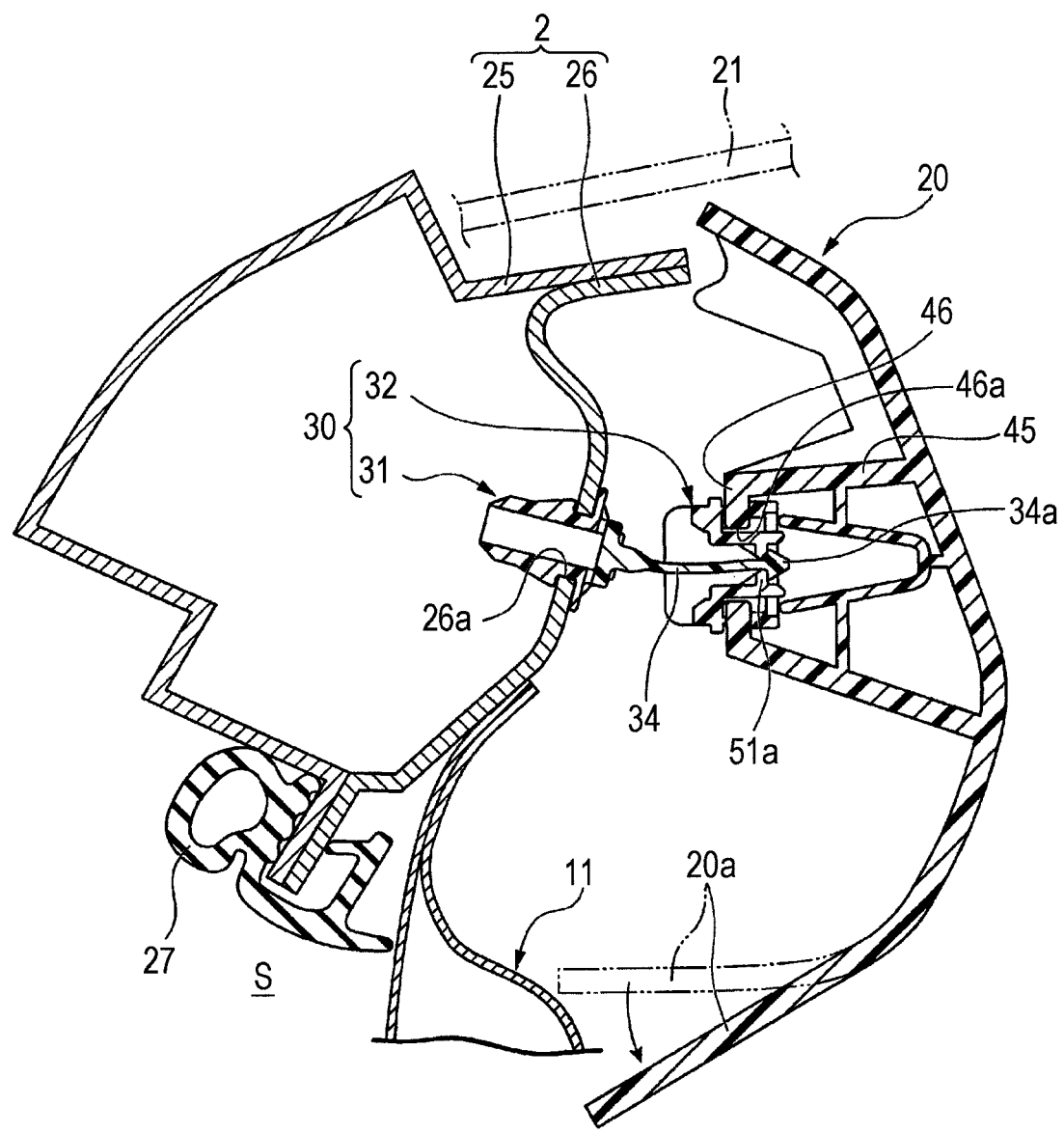
FIG. 7 shows the airbag body shown in FIG. 5 in the early stage of deployment.

Next, the operation of the side curtain airbag 10 configured as described above will be described. If while the vehicle is moving, owing to a side collision, rollover, or the like, an impact is input to the vehicle and an acceleration of a predetermined value or more is detected, gas is ejected from the inflator 5. As shown by an arrow in FIG. 3, this gas flows through the inlet 16 into the airbag body 11. Thus, each cell 15 can be inflated, and as shown in FIG. 7, the airbag body 11 can be deployed toward the interior of the vehicle while pushing the lower end wall 20a of the garnish 20 to open toward the interior of the vehicle. Thus, as shown in FIG. 8, the airbag body 11 can be deployed like a curtain so as to cover the side opening of the vehicle body 1, and occupants can be protected.

In this embodiment, when as shown in FIG. 7, the garnish 20 is pushed to open toward the interior of the vehicle by the deployment of the airbag body 11, the base member 32 of the fixation clip 30 fixed to the garnish 20 moves together with the garnish 20, is thus disengaged from the pin member 31, and moves relative to the pin member 31. The stroke restricting claws 51a of the base member 32 move along the stroke portion 34 of the pin member 31 and are finally caught and stopped by the stroke restricting portion 34a. This restricts the movement of the base member 32 toward the interior of the vehicle, thereby restricting the movement of the garnish 20 itself toward the interior of the vehicle. Thus, after the deployment of the airbag body 11, the garnish 20 is prevented from coming off the pillar inner panel 26 and flying in the interior of the vehicle.

Figure 8:
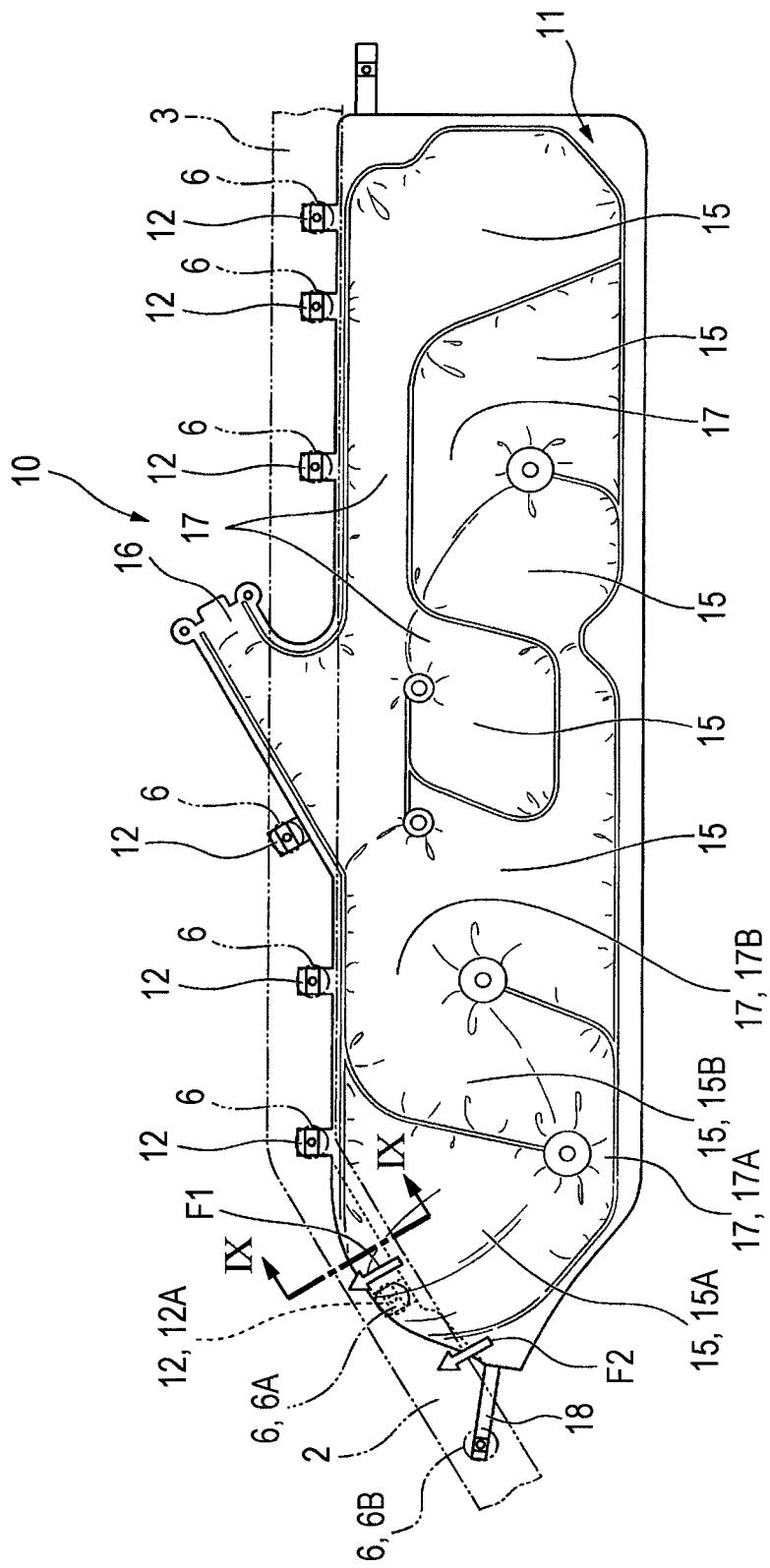
FIG. 8 shows the airbag body shown in FIG. 3 that has been fully deployed.

According to the side curtain airbag 10 of this embodiment, as shown in FIG. 8, of the plurality of cells 15 in the airbag body 11, the frontmost cell 15 (15A) has a range of bulging that is set such that the cell 15 (15A) bulges close to the frontmost airbag fixation portion 12 (12A), and thus the position of the cell 15 (15A) after bulging can be easily stabilized. Thus, the ability to protect occupants can be improved. In particular, a high ability to protect a person sitting in the driver's seat or the front passenger seat can be expected.

Figure 9:
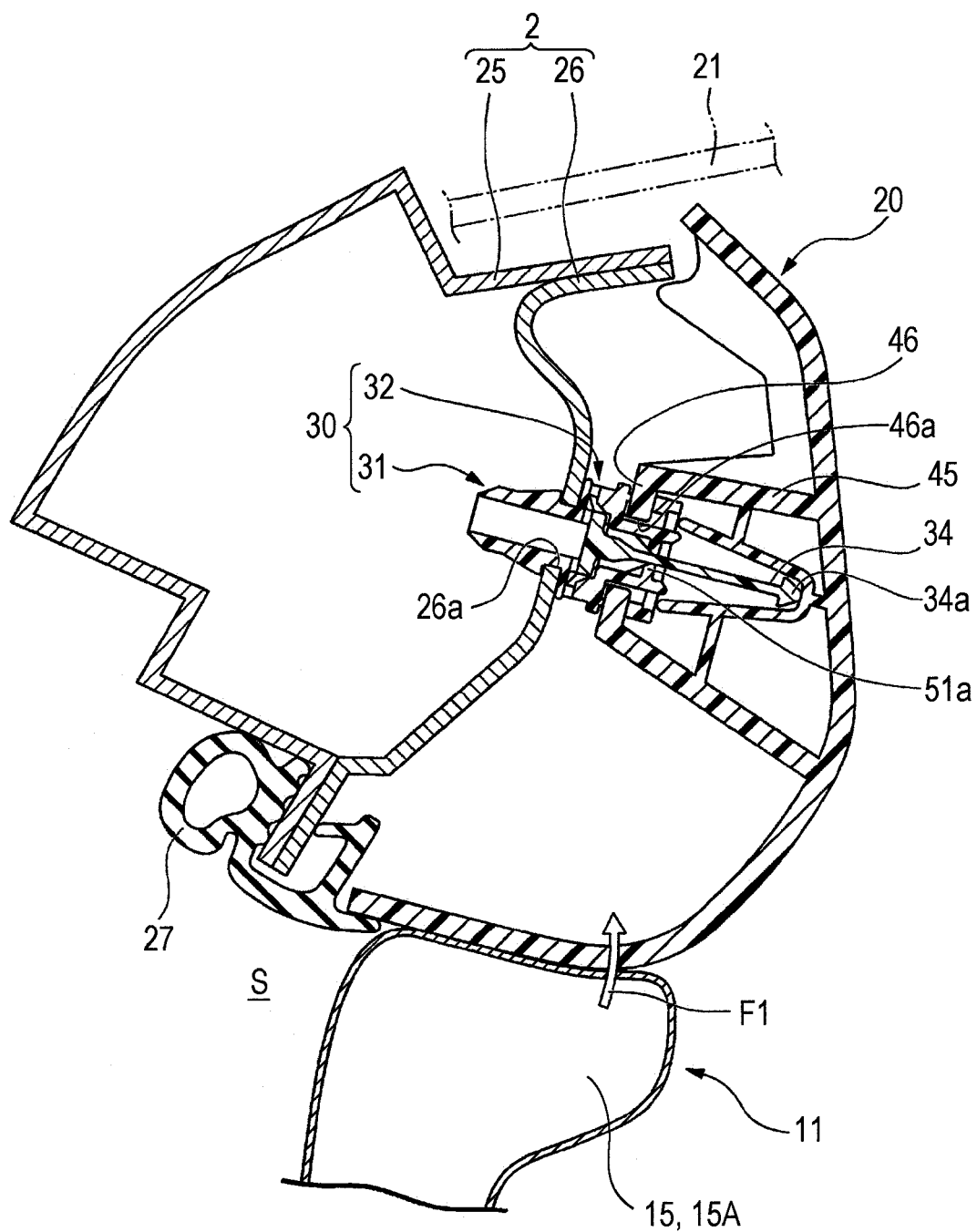
FIG. 9 is a sectional view taken along line IX-IX of FIG. 8.

As described above, when setting the airbag body 11, the front part thereof is bent downward, and the frontmost airbag fixation portion 12 (12A) is attached to the vehicle body side fixation portion 6 (6A). Thus, when the airbag body 11 is deployed, the frontmost cell 15 (15A) is pushed up by the deployment pressure as shown by the arrow F1 in FIG. 8. For this reason, the garnish 20 pushed to open toward the interior of the vehicle by the deployment of the airbag body 11 is pushed by the cell 15 (15A) as shown in FIG. 9 toward the front pillar 2 and is easily returned to the original state. Thus, the movement of the garnish 20 itself toward the interior of the vehicle after the deployment of the airbag body 11 can be suppressed. Even after the deployment of the airbag body 11, the impact absorbing performance of the garnish 20 itself can be obtained.

In this embodiment, the front tether 18 applies a force that pulls up the airbag body 11 (arrow F2 in FIG. 8) to the airbag body 11. Thus, after the deployment of the airbag body 11, the garnish 20 can be pushed toward the front pillar 2 more effectively. When the airbag body 11 is deployed, the frontmost cell 15 (15A) formed in a substantially triangular shape in plan view bulges close to the frontmost airbag fixation portion 12 (12A). Thus, also in this regard, after the deployment of the airbag body 11, the garnish 20 can be pushed toward the front pillar 2 more effectively. For this reason, the movement of the garnish 20 itself toward the interior of the vehicle after the deployment of the airbag body 11 can be effectively suppressed, and the impact absorbing performance of the garnish 20 itself can be easily obtained.

In the early stage of the deployment of the airbag body 11, the frontmost cell 15 (15A) is deployed later than the cell 15 (15B) second from the front. For this reason, the frontmost cell 15 (15A) less inflated than at the completion of deployment is pulled out toward the interior of the vehicle by the inflation of the cell 15 (15B) second from the front. After being pulled out, the frontmost cell 15 (15A) is inflated and is then completely deployed. Thus, the frontmost cell 15 (15A) can be pulled out toward the interior of the vehicle when the gap between the garnish 20 and the front pillar 2 is small, excessive stress can be prevented from acting on the garnish 20, and the damage of the garnish 20 can be easily prevented. After that, by the complete deployment after being pulled out, the garnish 20 can be pressed against the front pillar 2, and the original impact absorbing performance of the garnish 20 itself can be obtained.

In addition, according to the side curtain airbag 10 of this embodiment, as shown in FIG. 2, in the state before attachment, a plurality of airbag fixation portions 12 are aligned at substantially the same level. For this reason, the airbag body 11 can be rolled from its lower end in a simple manner, and rolling the airbag body 11 does not take a lot of time. After that, it is only necessary to attach the airbag fixation portions 12 to the vehicle body side fixation portions 6, and thus the side curtain airbag 10 can be set easily.

The technical scope of the present disclosure is not limited to the above-described embodiment, and various changes may be made therein without departing from the spirit of the present disclosure.

For example, in the above-described embodiment, the front tether 18 is not essential and may be omitted. Although the inlet 16 is provided in the middle part of the airbag body 11 in the front-rear direction, the inlet may be provided in the rear. In this case, the frontmost cell 15 (15A) deploys much later. This is more preferable.

Figure 10:
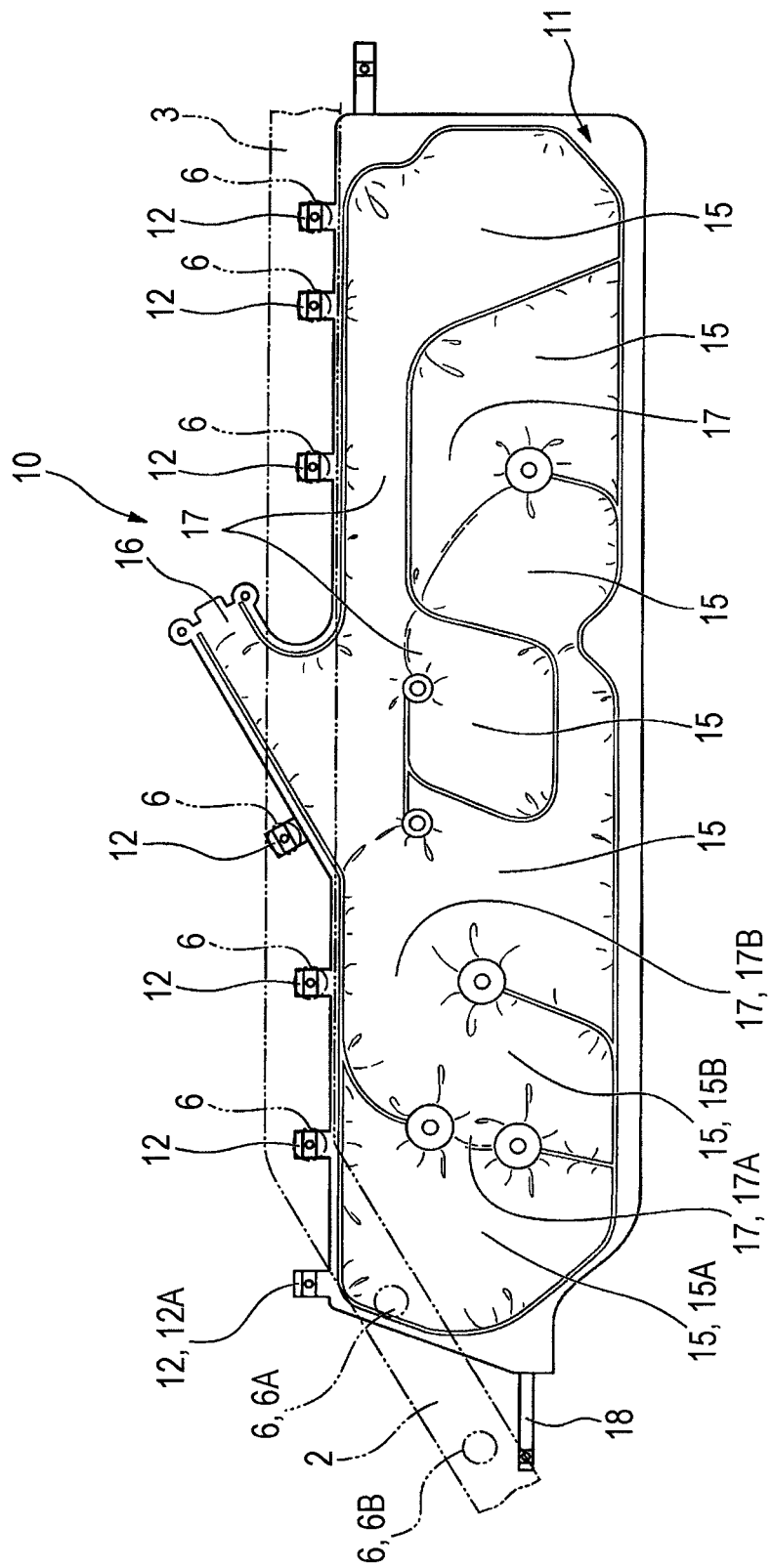
FIG. 10 is a plan view showing a modification of the side curtain airbag according to the embodiment. However, the side curtain airbag is not attached to the vehicle body.
Figure 11:
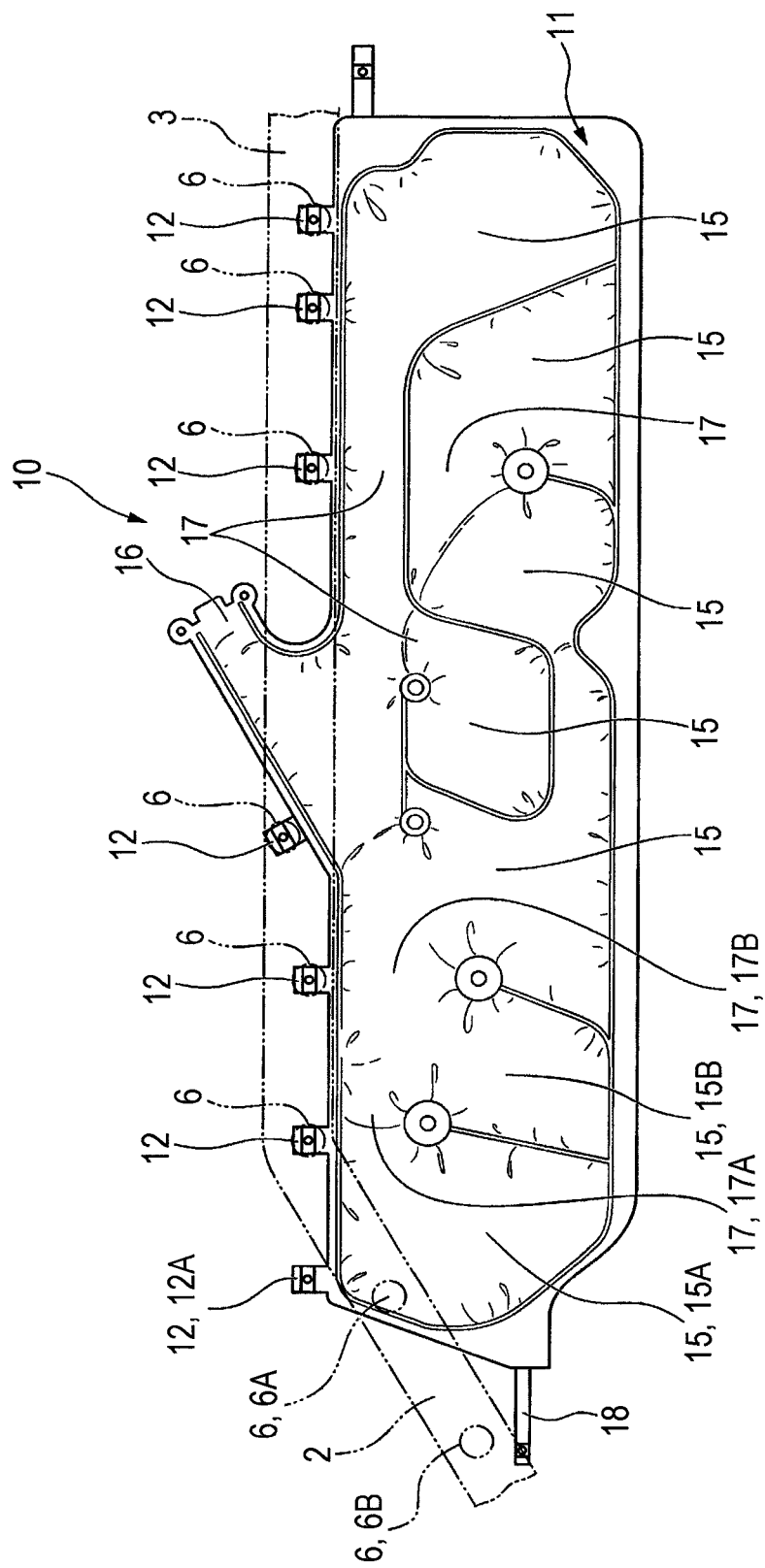
FIG. 11 is a plan view showing another modification of the side curtain airbag according to the embodiment. However, the side curtain airbag is not attached to the vehicle body.
Figure 12:
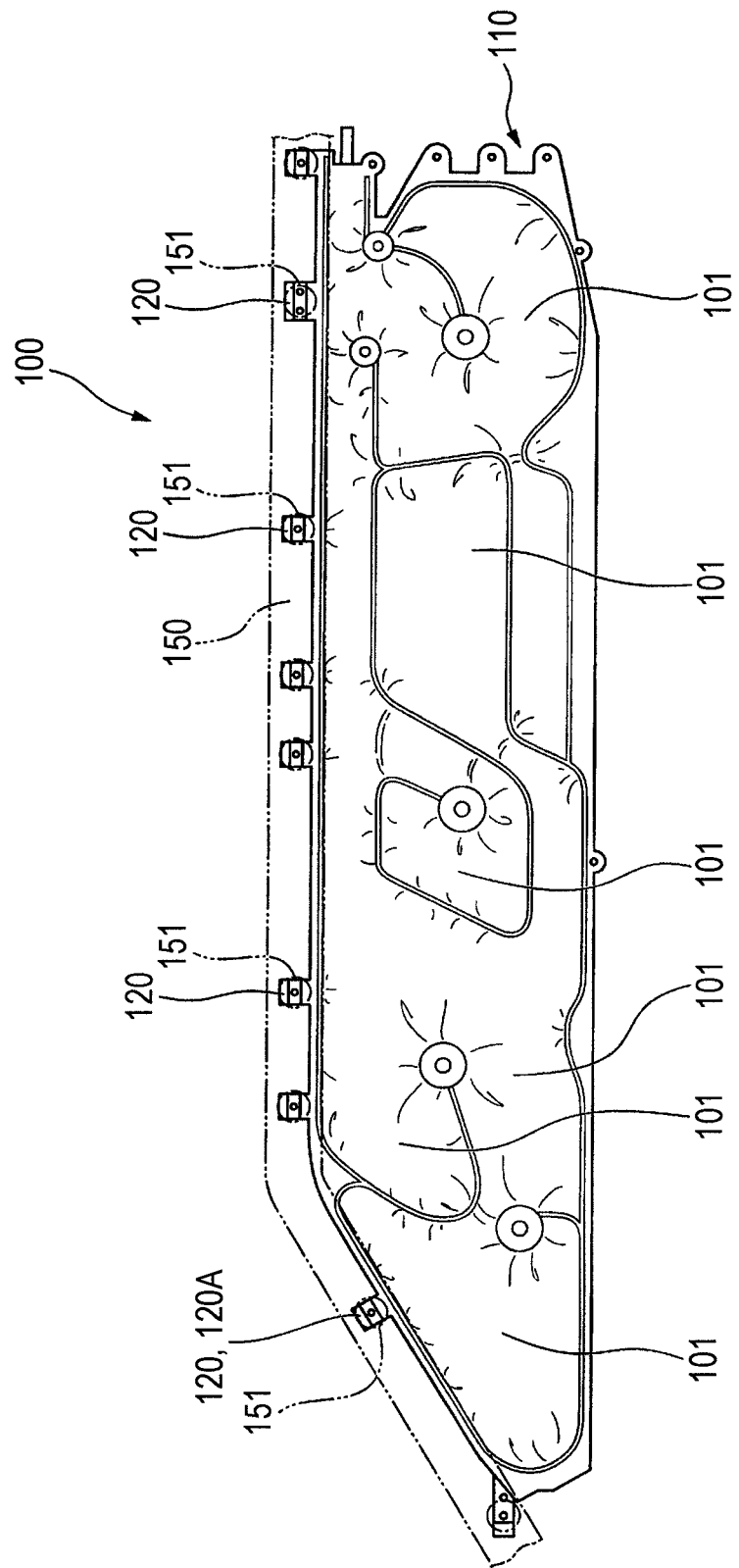
FIG. 12 is a plan view showing an example of a conventional side curtain airbag.
Figure 13:
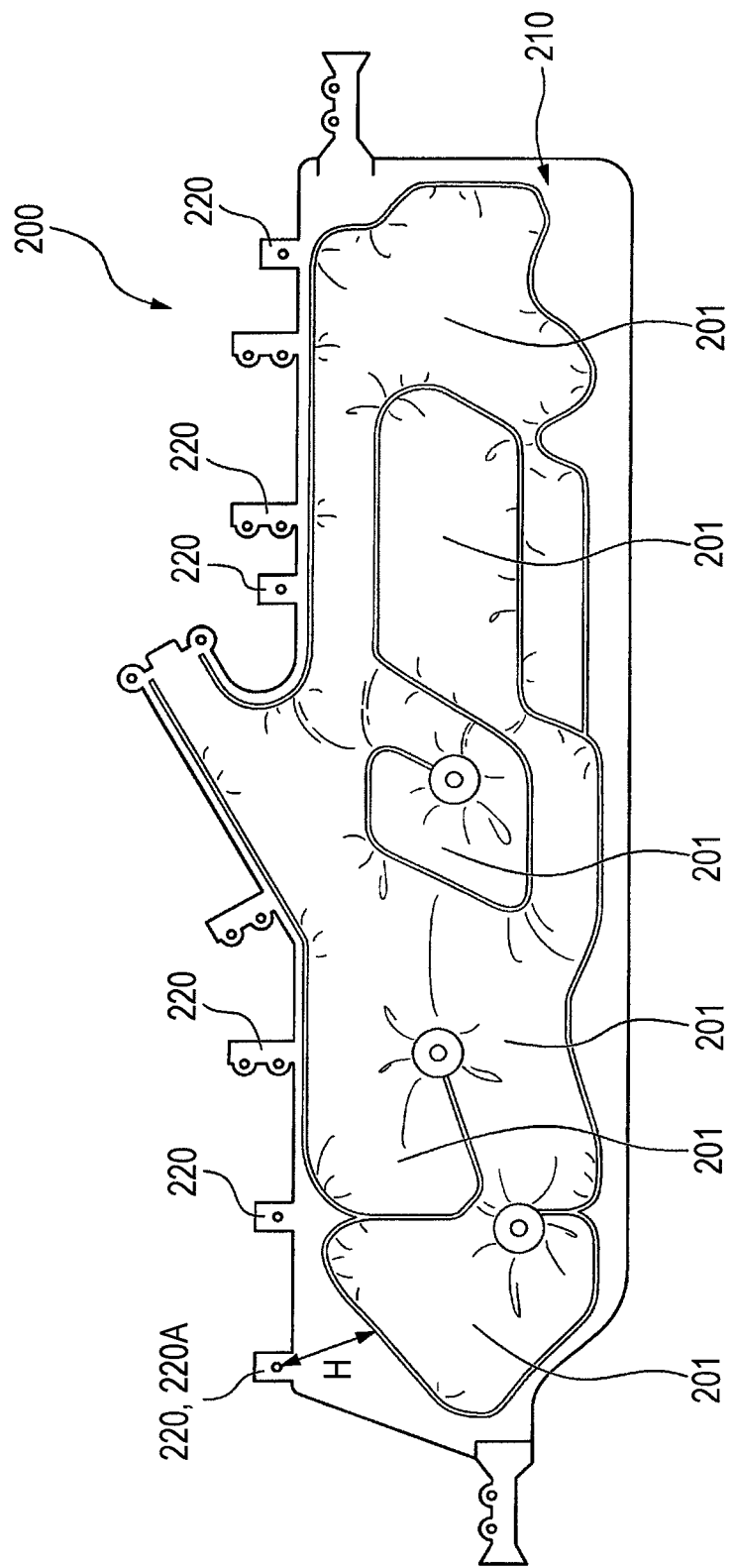
FIG. 13 is a plan view showing another example of a conventional side curtain airbag.
Figure 14:
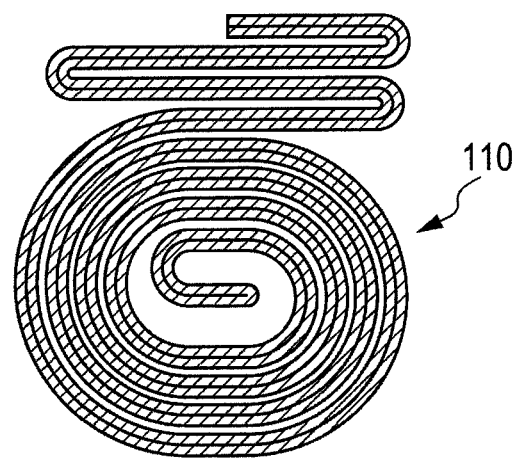
FIG. 14 is a sectional view showing the airbag body of the side curtain airbag shown in FIG. 12 that is folded.
Figure 15:
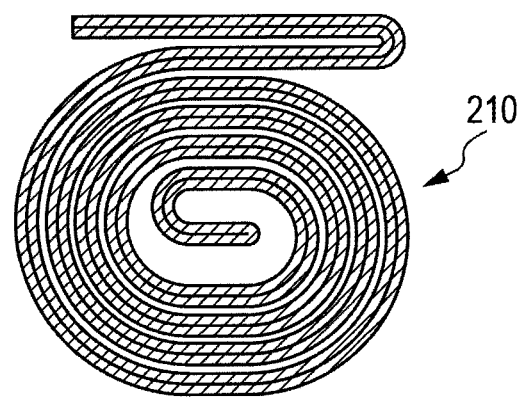
FIG. 15 is a sectional view showing the airbag body of the side curtain airbag shown in FIG. 13 that is folded.

In the above-described embodiment, the flow paths 17 are arranged such that the frontmost cell 15 (15A) deploys later. Alternatively, for example, as shown in FIGS. 10 and 11, the flow path 17 (17A) leading to the frontmost cell 15 (15A) may be made narrower than the other flow paths 17 so that the frontmost cell 15 (15A) deploys later.

Figure 16:
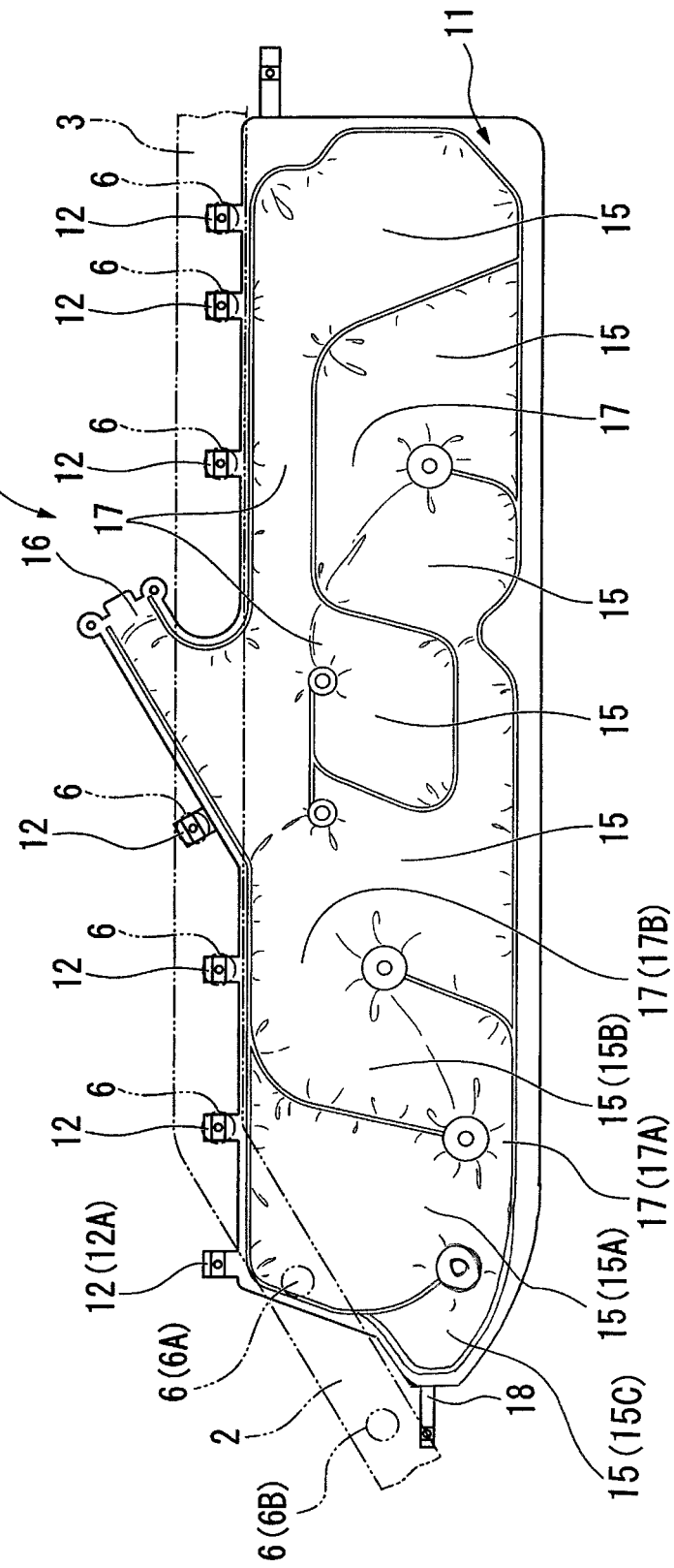
FIG. 16 is a plan view showing another modification of the side curtain airbag according to preferred embodiment. However, the side curtain airbag is not attached to the vehicle body.

As another embodiment, FIG. 16 shows another modification of the side curtain airbag according to preferred embodiment. In FIG. 16, it is noted that the side curtain airbag is not attached to the vehicle body. In FIG. 16, the position of an upper front cell 15A is not the frontmost. There is another cell 15C in front of the upper front cell 15A and there is an adjacent cell 15B in the rear direction of the vehicle. In the present application, "upper front cell" also covers this type of structure.

Figure 17:
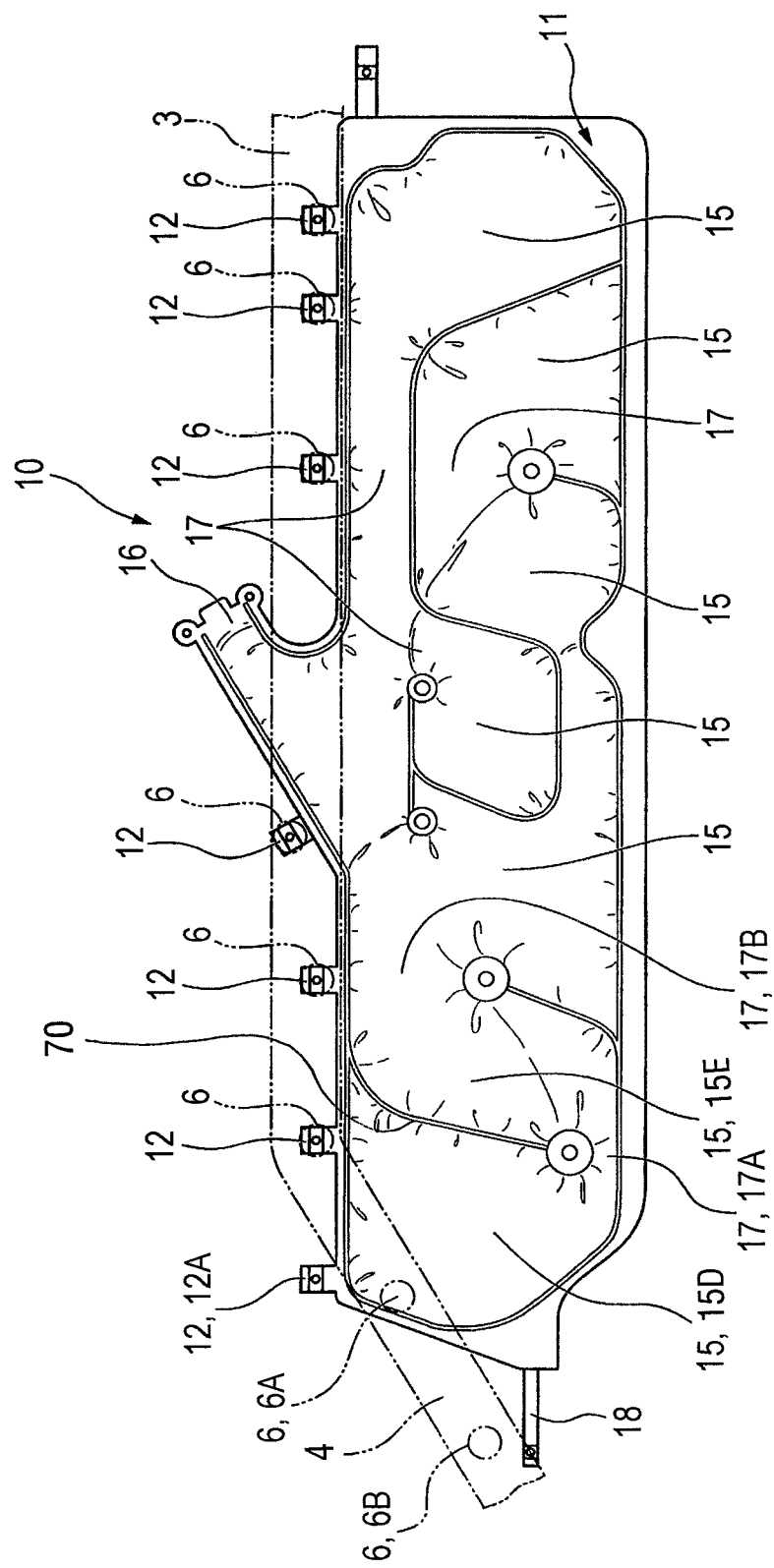
FIG. 17 is a plan view showing another modification of the side curtain airbag according to preferred embodiment. However, the side curtain airbag is not attached to the vehicle body.

As yet another embodiment, FIG. 17 shows another modification of the side curtain airbag according to preferred embodiment. In FIG. 17, it is noted that the side curtain airbag is not attached to the vehicle body. In FIG. 17, the left side shows the rear side of the vehicle as opposed to FIG. 2. Thus, the rearmost cell 15D is attached to the rear pillar 4 and the adjacent cell 15E is disposed in front direction of the vehicle. Other than the direction, the structure of this embodiment is the same as that of the embodiment of FIG. 2. Accordingly, the above descriptions related to the front side cell structure are also applicable to this embodiment.

We claim:

1. A side curtain airbag fixed to the interior of a vehicle using a plurality of vehicle body side fixation portions provided in a vehicle body frame member along a side opening of a vehicle body, and stored between the vehicle body frame member and an interior decoration member, the side curtain airbag comprising:
an airbag body divided into a plurality of cells that are inflated by gas flowing into them, the airbag body deploying toward the interior of the vehicle while pushing the interior decoration member to open; and
a plurality of airbag fixation portions provided along the upper periphery of the airbag body and attached to the plurality of vehicle body side fixation portions,
wherein in a state before attachment, of the plurality of airbag fixation portions, an upper front airbag fixation portion is located above an upper front vehicle body side fixation portion of the plurality of vehicle body side fixation portions, the upper front vehicle body side fixation portion corresponding to the upper front airbag fixation portion, and the upper front airbag fixation portion is located at substantially the same level as the other airbag fixation portions,
of the plurality of cells, an upper front cell is formed so as to bulge close to the upper front airbag fixation portion, and
wherein the upper front cell is formed such that the internal volume increases as approaching the upper front airbag fixation portion such that, when the airbag body is deployed, an inflated portion with the increased volume of the upper front cell pushes the interior decoration member from the outside thereof toward the vehicle body frame member.

2. The side curtain airbag according to claim 1, wherein a fastening member is provided in a part of the front periphery of the airbag body that is located below the plurality of airbag fixation portions in a state before attachment of the airbag body, and when the airbag body is attached, the fastening member is fastened to the vehicle body frame member while pulling up the airbag body.

3. The side curtain airbag according to claim 1, wherein of the plurality of cells, the upper front cell is deployed at least later than an adjacent cell next to the upper front cell in a rear direction of the vehicle.

4. The side curtain airbag according to claim 3, wherein the upper front cell includes an inflation gas flow path at a position such that the distance between the inflation gas flow path and the upper front airbag fixation portion is maximized.

5. The side curtain airbag according to claim 4, wherein the upper front cell and the adjacent cell are separated from each other by a partitioner and are communicated with each other via the inflation gas flow path, and
wherein the inflation gas flow path is disposed at a lower end of the partinioner.

6. The side curtain airbag according to claim 5, wherein the upper front cell is formed such that the internal volume is the smallest at the inflation gas flow path and increases as approaching the upper front airbag fixation portion.

7. The side curtain airbag according to claim 1, wherein the upper front cell is attached to a front pillar.

8. The side curtain airbag according to claim 7, wherein the upper front cell is attached to the front pillar by the upper front vehicle body side fixation portion provided to the front pillar.

9. A side curtain airbag fixed to the interior of a vehicle using a plurality of vehicle body side fixation portions provided in a vehicle body frame member along a side opening of a vehicle body, and stored between the vehicle body frame member and an interior decoration member, the side curtain airbag comprising:
an airbag body divided into a plurality of cells that are inflated by gas flowing into them, the airbag body deploying toward the interior of the vehicle while pushing the interior decoration member to open; and
a plurality of airbag fixation portions provided along the upper periphery of the airbag body and attached to the plurality of vehicle body side fixation portions,
wherein in a state before attachment, of the plurality of airbag fixation portions, an upper rear airbag fixation portion is located above an upper rear vehicle body side fixation portion of the plurality of vehicle body side fixation portions, the upper rear vehicle body side fixation portion corresponding to the upper rear airbag fixation portion, and the upper rear airbag fixation portion is located at substantially the same level as the other airbag fixation portions,
of the plurality of cells, an upper rear cell is formed so as to bulge close to the upper rear airbag fixation portion, and
wherein the upper rear cell is formed such that the internal volume increases as approaching the upper rear airbag fixation portion such that, when the airbag body is deployed, an inflated portion with the increased volume of the upper rear cell pushes the interior decoration member from the outside thereof toward the vehicle body frame member.

10. The side curtain airbag according to claim 9, wherein a fastening member is provided in a part of the rear periphery of the airbag body that is located below the plurality of airbag fixation portions in a state before attachment of the airbag body, and when the airbag body is attached, the fastening member is fastened to the vehicle body frame member while pulling up the airbag body.

11. The side curtain airbag according to claim 9, wherein of the plurality of cells, the upper rear cell is deployed at least later than an adjacent cell next to the upper rear cell in a front direction of the vehicle.

12. The side curtain airbag according to claim 11, wherein the upper rear cell includes an inflation gas flow path at a position such that the distance between the inflation gas flow path and the upper rear airbag fixation portion is maximized.

13. The side curtain airbag according to claim 12,
wherein the upper rear cell and the adjacent cell are separated from each other by a partitioner and are communicated with each other via the inflation gas flow path, and
wherein the inflation gas flow path is disposed at a lower end of the partinioner.

14. The side curtain airbag according to claim 13, wherein the upper rear cell is formed such that the internal volume is the smallest at the inflation gas flow path and increases as approaching the upper rear airbag fixation portion.

15. The side curtain airbag according to claim 9,
wherein the upper rear cell is attached to a rear pillar.

16. The side curtain airbag according to claim 15,
wherein the upper rear cell is attached to the rear pillar by the upper rear vehicle body side fixation portion provided to the rear pillar.

* * * * *